United States Patent
Iiyama et al.

(10) Patent No.: US 7,532,416 B2
(45) Date of Patent: *May 12, 2009

(54) IMAGING LENS, IMAGING UNIT AND OPTICAL DEVICE

(75) Inventors: Tomoko Iiyama, Osaka (JP); Kyoichi Miyazaki, Osaka (JP); Kazutake Boku, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

This patent is subject to a terminal disclaimer.

(21) Appl. No.: 10/571,618

(22) PCT Filed: Sep. 10, 2004

(86) PCT No.: PCT/JP2004/013566

§ 371 (c)(1),
(2), (4) Date: Mar. 10, 2006

(87) PCT Pub. No.: WO2005/026806

PCT Pub. Date: Mar. 24, 2005

(65) Prior Publication Data

US 2007/0053078 A1    Mar. 8, 2007

(30) Foreign Application Priority Data

Sep. 10, 2003    (JP) .............................. 2003-318012

(51) Int. Cl.
*G02B 9/14*    (2006.01)
(52) U.S. Cl. ...................................... 359/785; 359/739
(58) Field of Classification Search ......... 359/785–789, 359/738–739
See application file for complete search history.

(56) References Cited

U.S. PATENT DOCUMENTS

| 6,466,377 | B1 | 10/2002 | Saito et al. |
| 6,970,306 | B2 * | 11/2005 | Matsuo ........................ 359/716 |
| 6,977,779 | B2 * | 12/2005 | Shinohara .................... 359/716 |
| 7,035,023 | B2 * | 4/2006 | Nanba et al. ................. 359/785 |
| 2003/0193605 | A1 | 10/2003 | Yamaguchi |
| 2004/0150893 | A1 | 8/2004 | Shinohara |
| 2004/0212901 | A1 | 10/2004 | Nanba et al. |
| 2005/0013017 | A1 * | 1/2005 | Amanai ....................... 359/781 |

FOREIGN PATENT DOCUMENTS

| JP | 62-116915 | 5/1987 |
| JP | 62-191813 | 8/1987 |
| JP | 08-234097 | 9/1996 |
| JP | 2001-75006 | 3/2001 |
| JP | 2003-149547 | 5/2003 |
| JP | 2003-195158 | 7/2003 |
| JP | 2004-4566 | 1/2004 |
| JP | 2004-226487 | 8/2004 |
| JP | 2004-240063 | 8/2004 |
| JP | 2004-325713 | 11/2004 |

* cited by examiner

*Primary Examiner*—Jordan M. Schwartz
(74) *Attorney, Agent, or Firm*—McDermott Will & Emery LLP

(57) ABSTRACT

An imaging lens system for forming an optical image of an object on a light receiving surface of a solid-state image sensor, comprising, in order from an object side, an aperture diaphragm, and three lens elements, i.e., a first lens element which is a bi-aspherical lens having a positive optical power and a convex surface on an image side, a second lens element having a negative optical power and being a bi-aspherical meniscus lens whose object side has a concave shape, and a third lens element having a positive optical power and being a bi-aspherical meniscus lens whose object side has a convex shape.

16 Claims, 10 Drawing Sheets

IMAGING LENS, IMAGING UNIT AND OPTICAL DEVICE

RELATED APPLICATION

This application is a national phase of PCT/JP2004/013566 filed on Sep. 10, 2004, which claims priority from Japanese Application No. 2003-318012 filed on Sep. 10, 2003, the disclosures of which Applications are incorporated by reference herein. The benefit of the filing and priority dates of the International and Japanese Applications is respectfully requested.

TECHNICAL FIELD

The present invention relates to an imaging lens system, a compact imaging unit using a solid-state image sensor such as a CCD or a CMOS, and an optical device such as a digital still camera or a compact camera used in a personal digital assistance.

BACKGROUND ART

Recently, as a digital still camera (hereinafter, referred to as a DSC) or the like has rapidly gained popularity, imaging lenses with high optical performance compatible with a large number of pixels equal to or more than five million pixels have been commercialized for use in an image input device recording a digital image. In addition, many mobile telephones or PDA terminals provided with a compact camera have been commercialized, and accepted in the marketplace. Among them, compact imaging units and imaging lenses compatible with a large number of pixels (two million to four million pixels) equivalent to that of a DSC are particularly gaining attention for use in, for example, compact cameras provided in mobile terminals or the like, in particular.

Conventional downsized imaging units and imaging lenses can be largely divided into two groups.

One is imaging lenses used mainly in mobile telephones for which downsizing and cost reduction are sought, PC (personal computer) cameras, PDAs, or the like, as disclosed in Japanese Laid-Open Patent Publication No. 2003-195158, for example. These are highly attractive in their sizes and costs and thereby commercialized in a large number, but not compatible with a large number of pixels, and, in many cases, they are only compatible with about one hundred thousand to three hundred fifty thousand pixels. A compact image sensor having an image quality of more than one million pixels is proposed, as disclosed in Japanese Laid-Open Patent Publication No. 2003-149547, for example. However, the number of lenses therein is as many as four or more, and a less expensive, compact type is sought for portability.

The other is in a field applied in endoscopes, surveillance cameras, or the like. The lenses achieve high optical performance and downsizing of some extent. However, the number of lenses therein is as many as six to nine to ensure the required performance, and portability and cost thereof do not allow a common use.

DISCLOSURE OF THE INVENTION

In the above imaging unit and the imaging lens, in order to achieve a favorable optical performance while adopting an inexpensive configuration and trying to downsize its entire lens system, the lens shape or the like need to be appropriately configured while keeping the number of lenses to a minimum.

Generally, in order to downsize, an optical power of lenses is increased. However, when the optical power of the lenses is increased, aberration occurred in each of the lenses becomes large, thereby causing a problem that favorable aberration compensation in the entire optical system is difficult.

The object of the present invention is to provide, by employing an imaging lens configured with three, as the minimum number, lenses, and adopting an appropriate configuration for each of the lenses, the imaging lens and an optical device for which an entire lens system is downsized and a high optical performance is obtained.

In order to solve the above problem, the present invention provides an imaging lens system for forming an optical image of an object on a light receiving surface of a solid-state image sensor; comprising, in order from an object side: an aperture diaphragm, and three lens elements, i.e., a first lens element which is a bi-aspherical lens having a positive optical power and a convex surface on an image side, a second lens element having a negative optical power and being a bi-aspherical meniscus lens whose object side has a concave shape and a third lens element having a positive optical power and being a bi-aspherical meniscus lens whose object side has a convex shape; and satisfying the following conditional expressions:

$$1.5 < |fd/f2d| < 2.3 \tag{1}$$

$$0.5 < |fd/f3d| < 1.1 \tag{2}$$

$$-2.2 < (r_{21}+r_{22})/(r_{21}-r_{22}) < -1.3 \tag{3}$$

$$-2.1 < (r_{31}+r_{32})/(r_{31}-r_{32}) < -1.7 \tag{4}$$

here, fd is a composite focal length of an entire imaging lens system to d-line (mm), f2d is a focal length of the second lens element to the d-line (mm), f3d is a focal length of the third lens element to the d-line (mm), $r_{21}$ is a radius of curvature of an object side surface of the second lens element (mm), $r_{22}$ is a radius of curvature of an image side surface of the second lens element (mm), $r_{31}$ is a radius of curvature of an object side surface of the third lens element (mm), and $r_{32}$ is a radius of curvature of an image side surface of the third lens element (mm).

BEST MODE FOR CARRYING OUT THE INVENTION

Figure 1:
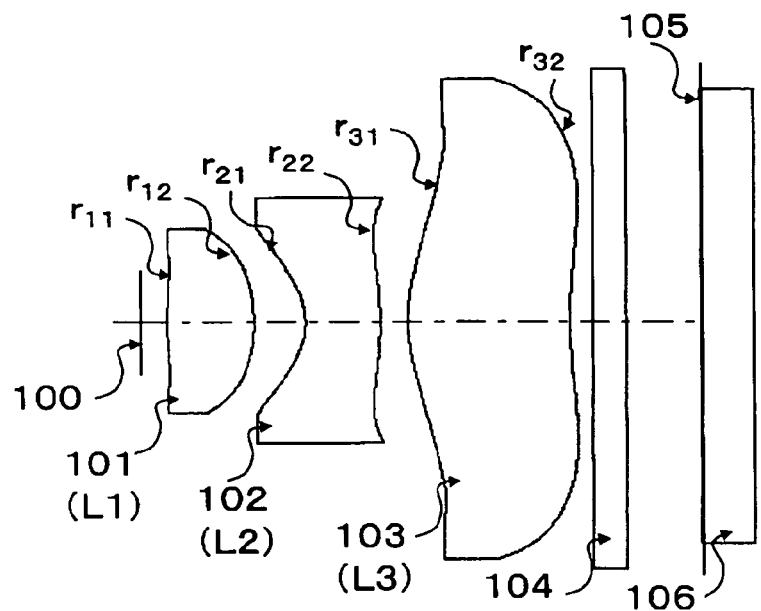
FIG. 1 is a schematic configuration diagram of an imaging lens according to Embodiment 1 of the present invention.
Figure 2:
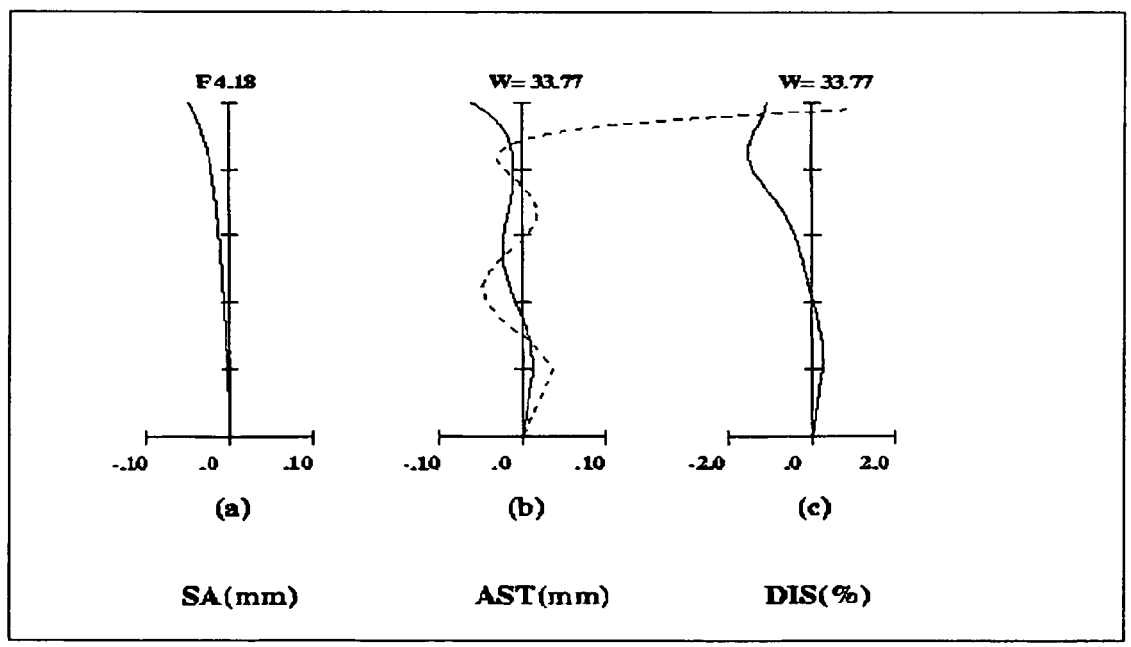
FIG. 2 is an aberration diagram of the imaging lens according to Embodiment 1 of the present invention.
Figure 3:
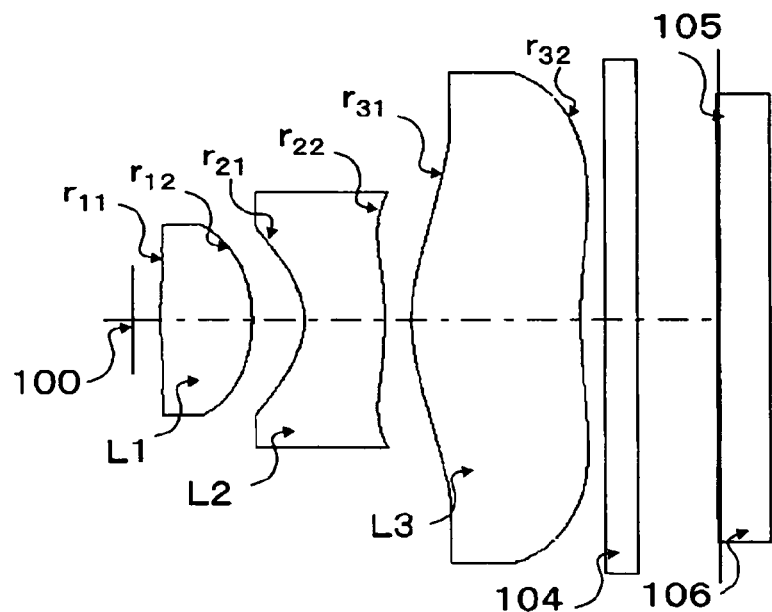
FIG. 3 is a schematic configuration diagram of an imaging lens according to Embodiment 2 of the present invention.
Figure 4:
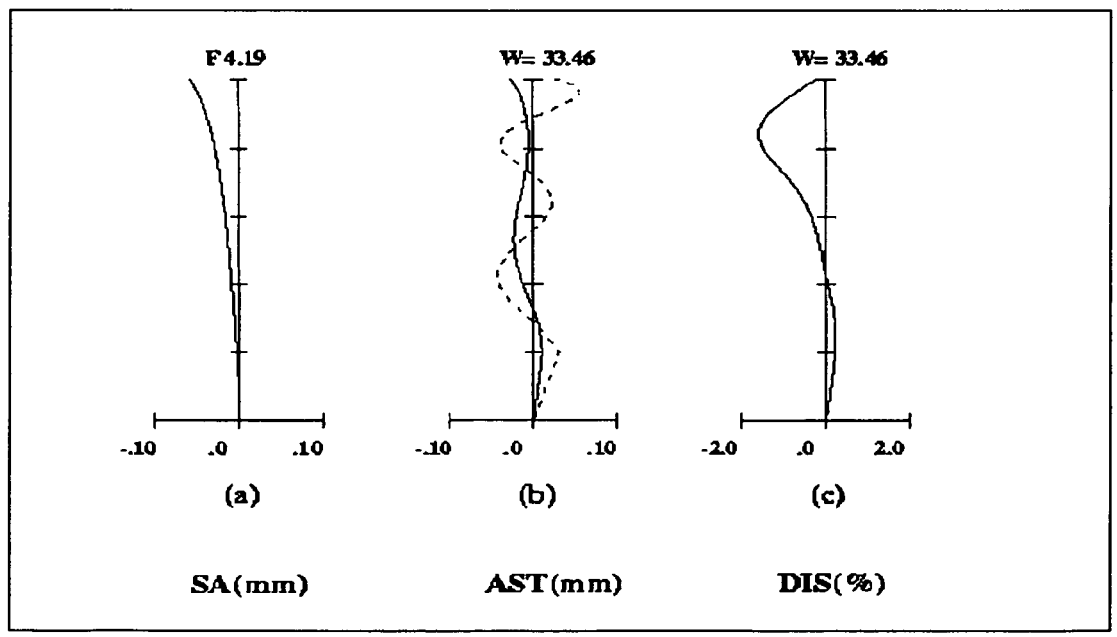
FIG. 4 is an aberration diagram of the imaging lens according to Embodiment 2 of the present invention.
Figure 5:
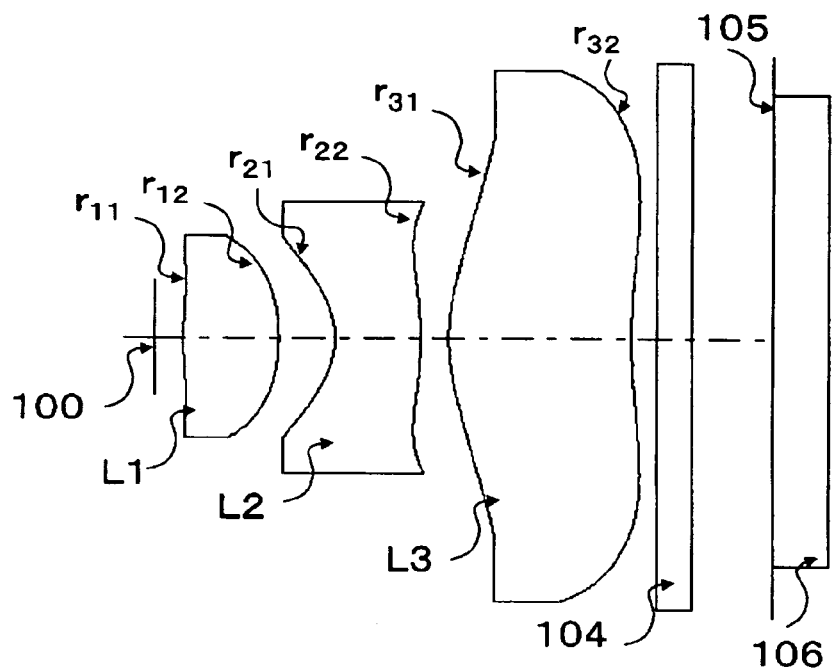
FIG. 5 is a schematic configuration diagram of an imaging lens according to Embodiment 3 of the present invention.
Figure 6:
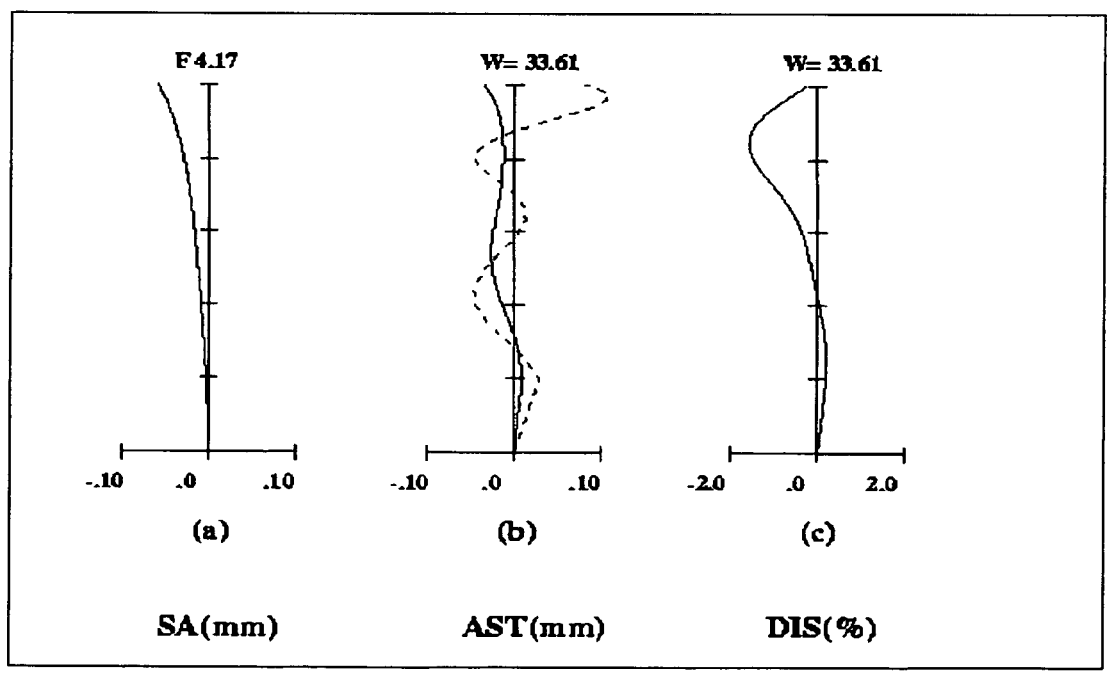
FIG. 6 is an aberration diagram of the imaging lens according to Embodiment 3 of the present invention.
Figure 7:
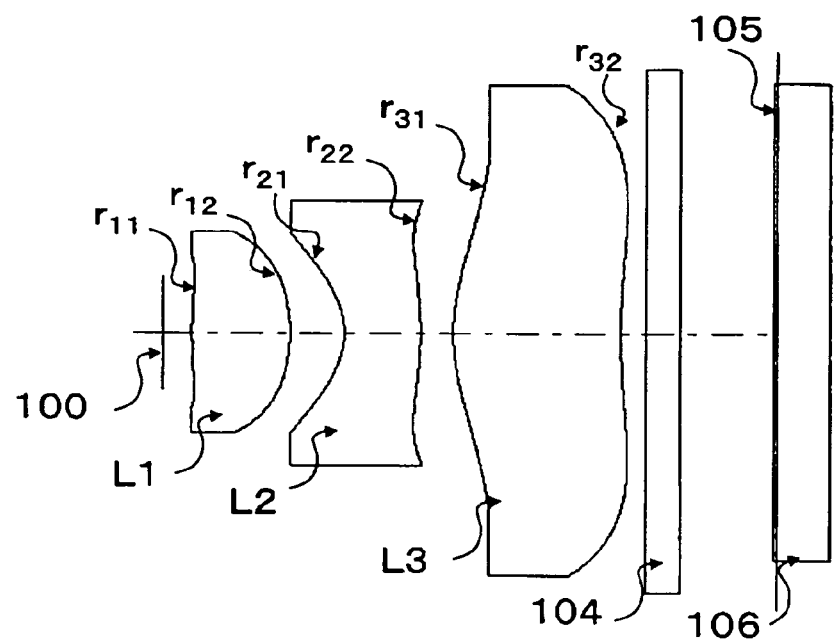
FIG. 7 is a schematic configuration diagram of an imaging lens according to Embodiment 4 of the present invention.
Figure 8:
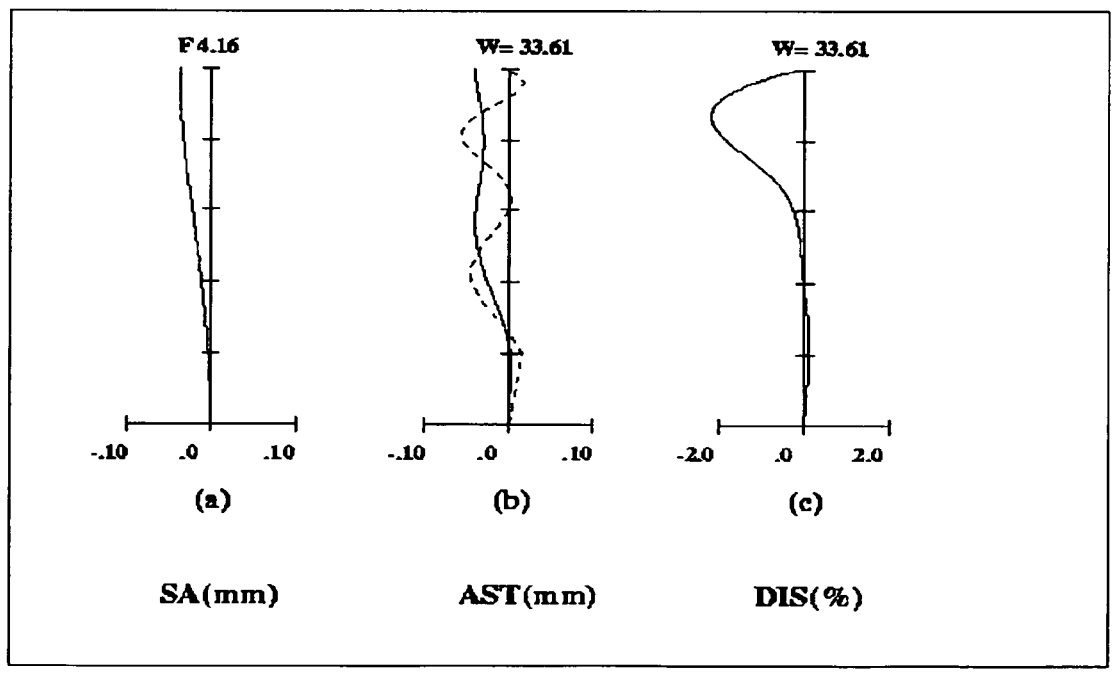
FIG. 8 is an aberration diagram of the imaging lens according to Embodiment 4 of the present invention.
Figure 9:
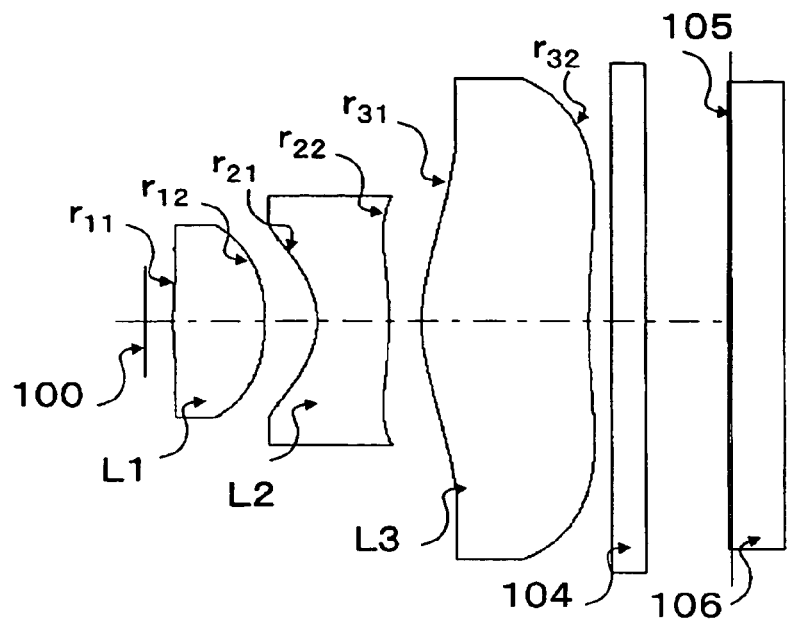
FIG. 9 is a schematic configuration diagram of an imaging lens according to Embodiment 5 of the present invention.
Figure 10:
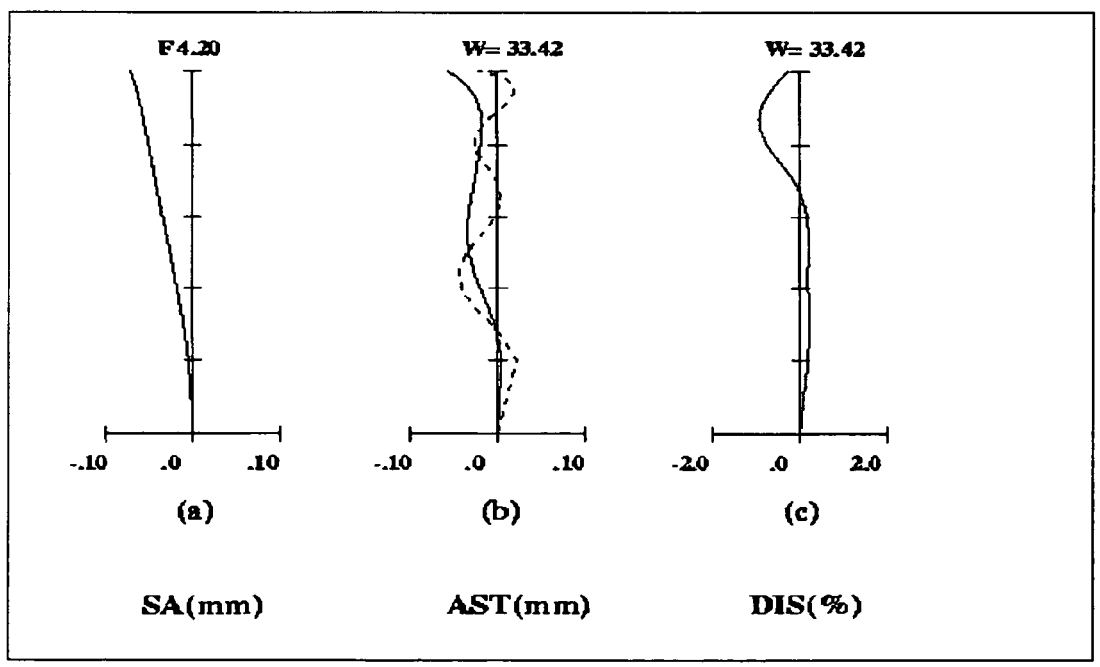
FIG. 10 is an aberration diagram of the imaging lens according to Embodiment 5 of the present invention.
Figure 11:
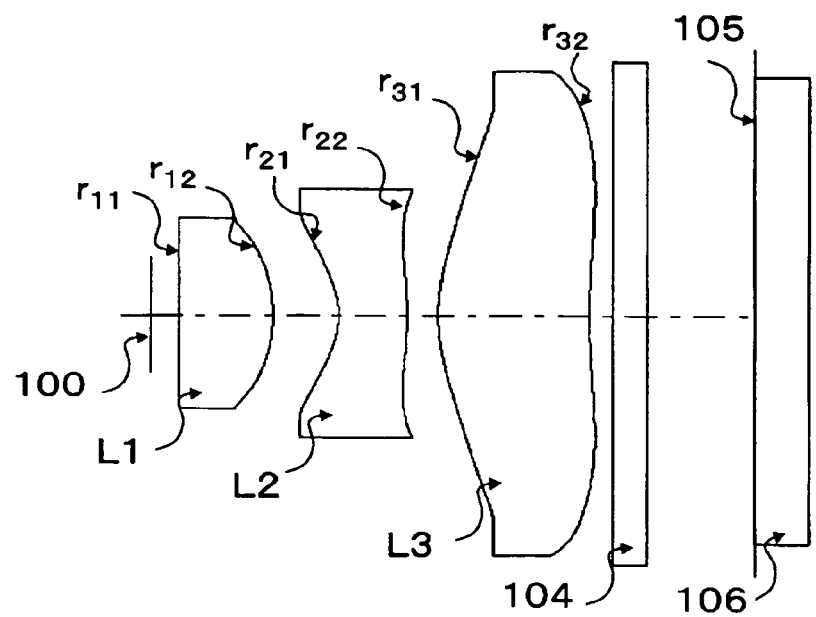
FIG. 11 is a schematic configuration diagram of an imaging lens according to Embodiment 6 of the present invention.
Figure 12:
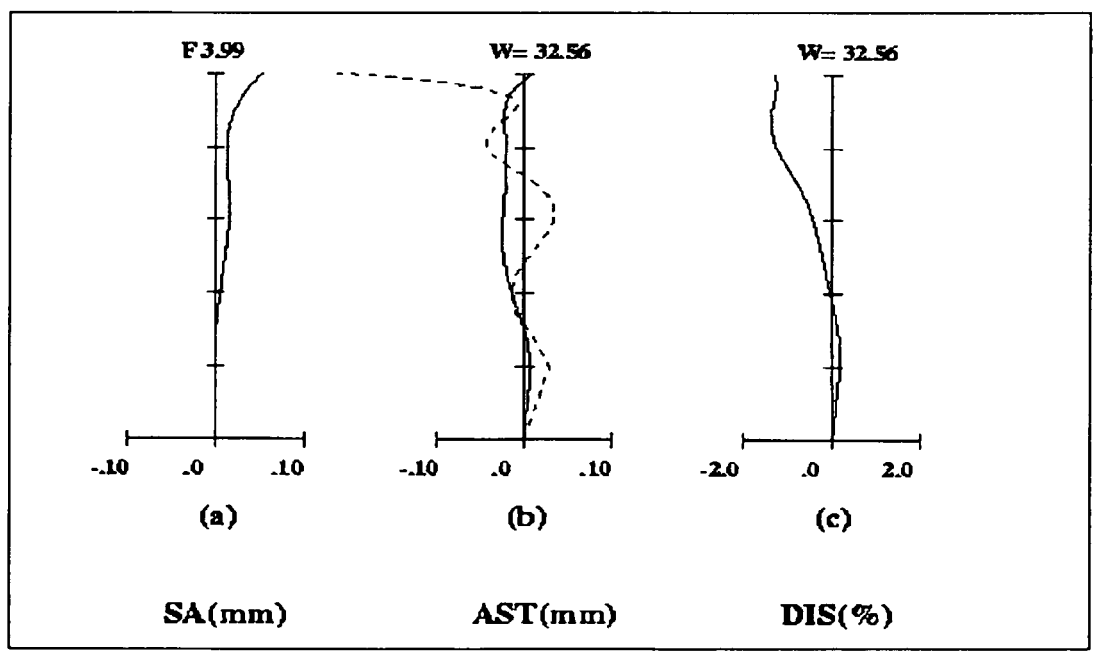
FIG. 12 is an aberration diagram of the imaging lens according to Embodiment 6 of the present invention.
Figure 13:
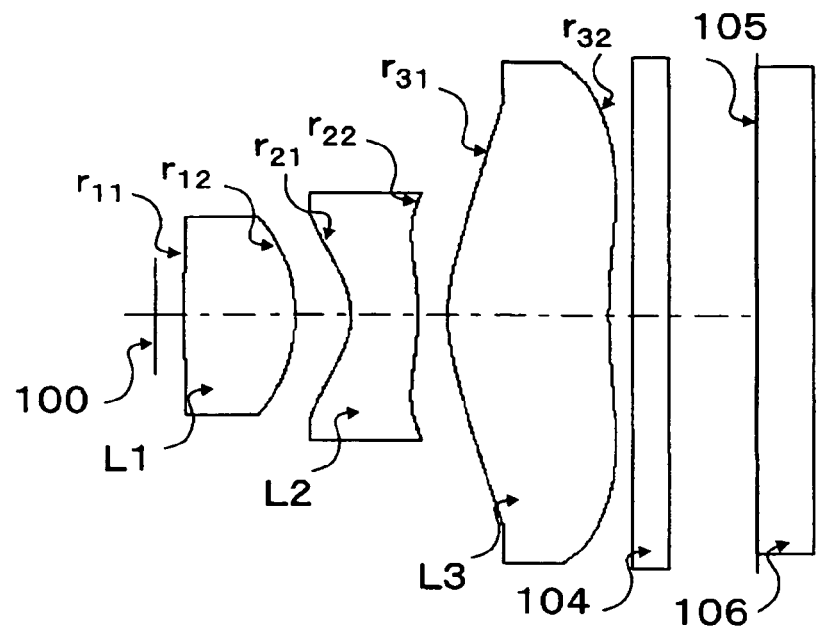
FIG. 13 is a schematic configuration diagram of an imaging lens according to Embodiment 7 of the present invention.
Figure 14:
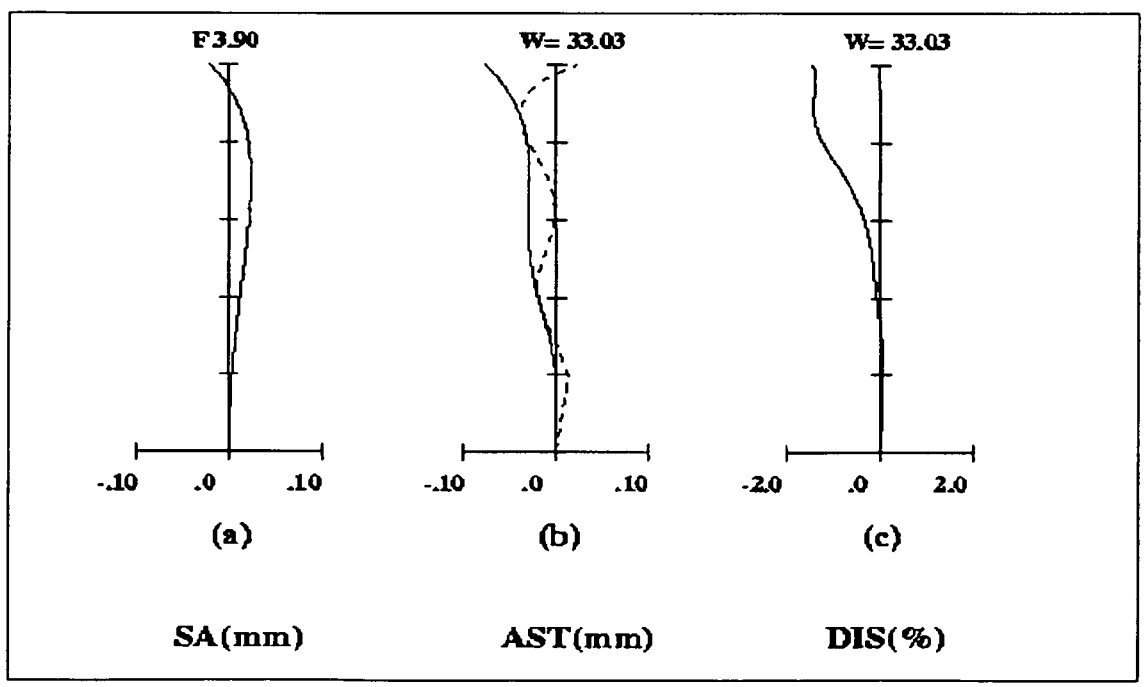
FIG. 14 is an aberration diagram of the imaging lens according to Embodiment 7 of the present invention.
Figure 15:
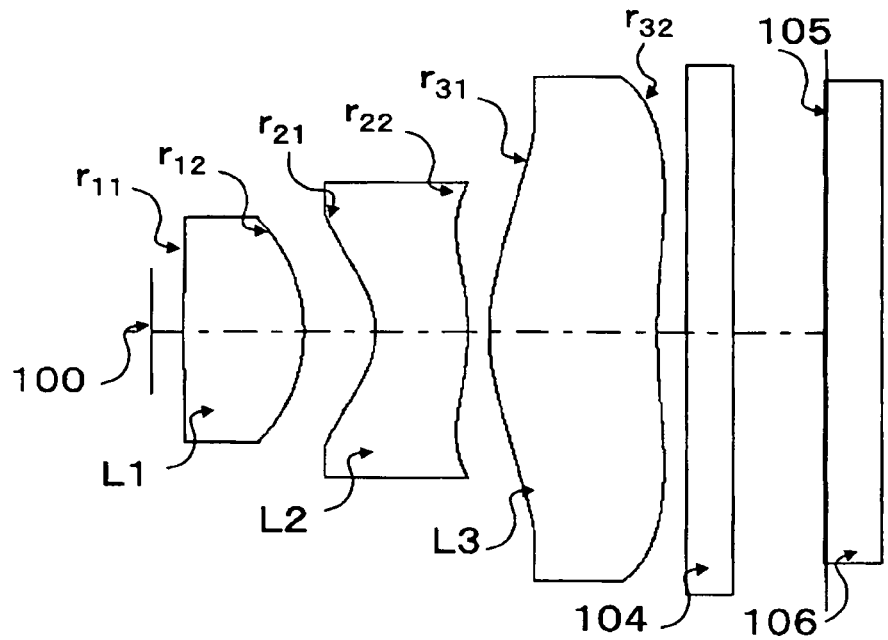
FIG. 15 is a schematic configuration diagram of an imaging lens according to Embodiment 8 of the present invention.
Figure 16:
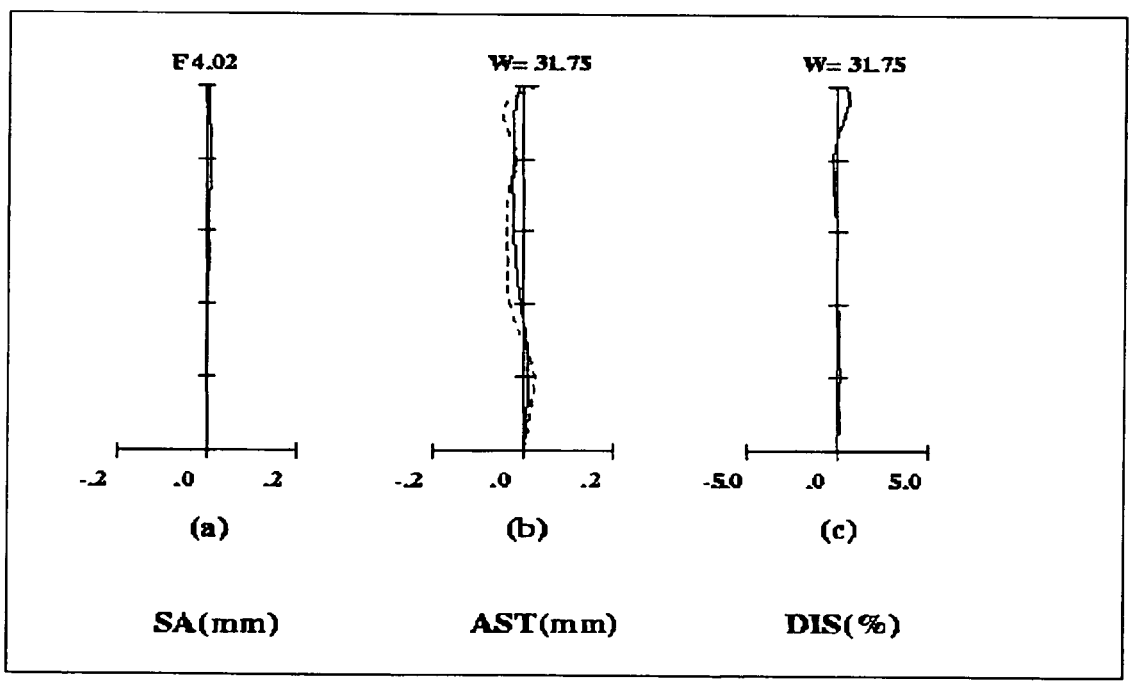
FIG. 16 is an aberration diagram of the imaging lens according to Embodiment 8 of the present invention.
Figure 17:
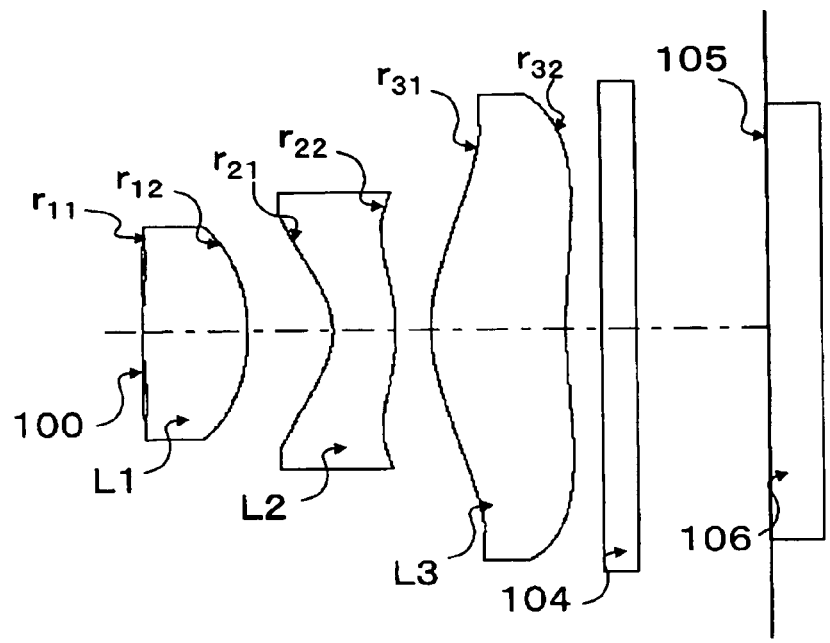
FIG. 17 is a schematic configuration diagram of an imaging lens according to Embodiment 9 of the present invention.
Figure 18:
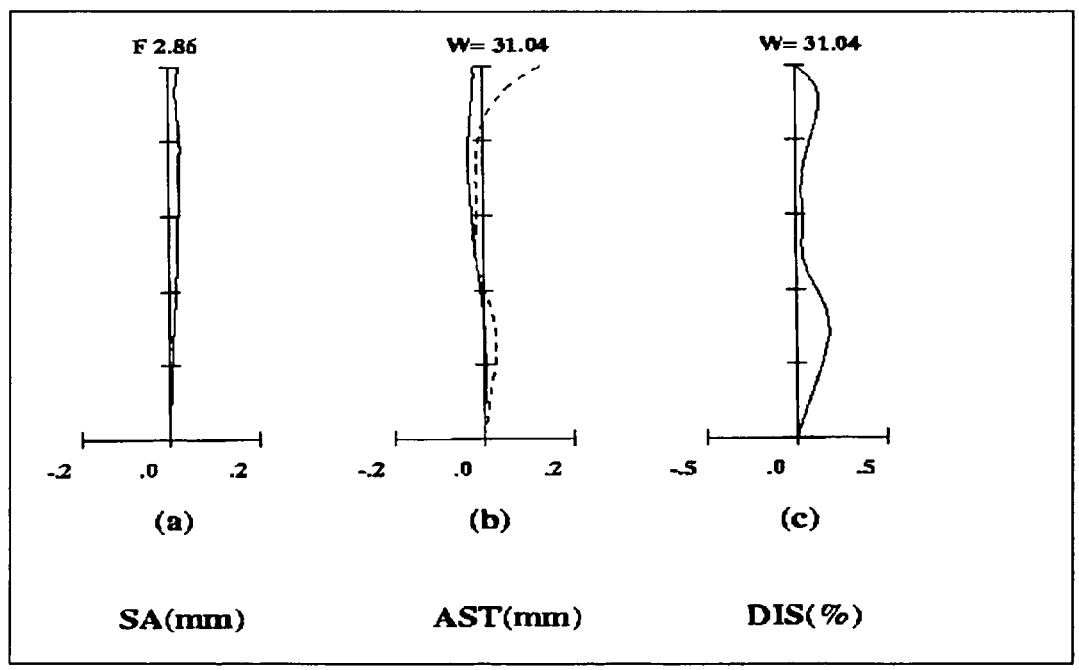
FIG. 18 is an aberration diagram of the imaging lens according to Embodiment 9 of the present invention.

Hereinafter, an embodiment of the present invention is described.

FIGS. 1, 3, 5, 7, 9, 11, 13, 15, and 17 are schematic configuration diagrams illustrating imaging lenses according to Embodiments 1, 2, 3, 4, 5, 6, 7, 8, and 9 of the present invention, respectively.

In each of the diagrams, in order from an object side, 100 denotes an aperture diaphragm, 101 denotes a first lens element (hereinafter, refers to as an "L1"), 102 denotes a second lens element (hereinafter, refers to as an "L2"), 103 denotes a third lens element (hereinafter, refers to as an "L3"), 104 denotes an optical low-pass filter (hereinafter, refers to as an "OLPF"), 105 denotes an image plane, and 106 denotes a solid-state image sensor such as a CCD or a CMOS.

In the above configuration, an imaging lens system includes the aperture diaphragm 100, the first lens element L1, the second lens element L2, and the third lens element L3, and an imaging unit includes the imaging lens system and the solid-state image sensor 106.

The first lens element L1, the second lens element L2, and the third lens element L3 are all lenses having aspherical surfaces on both faces. The shapes of these aspherical surfaces are represented by the following expression.

$$Z = \frac{(1/CR) \cdot H^2}{1 + \sqrt{1-(1+K)\cdot(1/CR)^2 \cdot H^2}} + \sum_{n=4}^{16} An \cdot H^n$$

Here, in a cylindrical coordinate system including a Z axis referring to an axis extending toward an image plane side along an optical axis direction, and an H axis referring to an axis vertically extending along a direction away from the optical axis; CR is a paraxial radius of curvature (mm), K is a conic coefficient, and An is an n-th order aspherical coefficient.

The first lens element L1 is a lens, formed by a glass material or from a synthetic resin material, of aspherical surfaces on both faces, and having a positive optical power. The second lens element L2 is a lens, formed from the synthetic resin material, of aspherical surfaces on both faces, and having a negative optical power. The third lens element L3 is a lens, formed from the synthetic resin material, of aspherical surfaces on both faces, and having a positive optical power.

In order to obtain a compact body and a favorable image quality for the imaging lens system according to each of the embodiments, power of the second lens element L2 and the third lens element L3 need to be designed with appropriate values, and bending shape thereof also need to be designed with appropriate values. For this reason, it is preferable that the following conditional expressions are satisfied.

$$1.5 < |fd/f2d| < 2.3 \quad (1)$$

$$0.5 < |fd/f3d| < 1.1 \quad (2)$$

$$-2.2 < (r_{21}+r_{22})/(r_{21}-r_{22}) < -1.3 \quad (3)$$

$$-2.1 < (r_{31}+r_{32})/(r_{31}-r_{32}) < -1.7 \quad (4)$$

Here, fd is a composite focal length of the entire lens system to d-line (mm), f2$d$ is a focal length of the second lens element L2 to the d-line (mm), f3$d$ is a focal length of the third lens element L3 to the d-line (mm), $r_{21}$ is a radius of curvature of an object side surface of the second lens element L2 (mm), $r_{22}$ is a radius of curvature of an image side surface of the second lens element L2 (mm), $r_{31}$ is a radius of curvature of an object side surface of the third lens element L3 (mm), and $r_{32}$ is a radius of curvature of an image side surface of the third lens element L3 (mm).

The above conditional expression (1) indicates the power of the second lens element L2 with respect to power of the entire lens system. When the lower limit of the expression is exceeded, chromatic aberration is insufficiently compensated, causing difficulties in obtaining a favorable image quality. Also, when the upper limit thereof is exceeded, the amount of aberration occurrence in a single lens corresponding to the second lens element L2 becomes excessively large, causing difficulties in obtaining a favorable image quality in the entire lens system.

The conditional expression (2) indicates the power of the third lens element L3 with respect to the power of the entire lens system. When the lower limit of the expression is exceeded, a position of principal points for the entire lens system becomes excessively close to the image side, causing difficulties in downsizing and in obtaining a favorable image quality. Also, when the upper limit thereof is exceeded, the amount of aberration occurrence in a single lens corresponding to the third lens element L3 becomes excessively large, causing difficulties in obtaining a favorable image quality in the entire lens system, and simultaneously, the tilt angle of a surface in the neighborhood of an effective diameter of the image side surface $r_{32}$ of the third lens element L3 becomes excessively large, causing difficulties in manufacturing thereof.

The conditional expression (3) represents a shape factor indicating a bending shape of the second lens element L2. When the lower limit of the expression is exceeded, spherical aberration due to the object side surface $r_{21}$ thereof occurs in a large amount, and, when the upper limit thereof is exceeded, astigmatism due to the image side surface $r_{22}$ of the second lens element L2 occurs in a large amount, causing difficulties in obtaining a favorable quality in either case.

The conditional expression (4) represents a shape factor indicating a bending shape of the third lens element L3. When the lower limit of the expression is exceeded, astigmatism occurs in a large amount, and, when the upper limit thereof is exceeded, spherical aberration due to the image side surface $r_{32}$ of the third lens element L3 occurs in a large amount, causing difficulties in obtaining a favorable quality in either case.

More preferably, in consideration of lens manufacturing, it is preferable that the tilt angle of a surface $\theta_{32}$ in the neighborhood of the effective diameter of the image side surface $r_{32}$ of the third lens element L3 satisfies the following conditional expression (13).

$$\theta_{32} < 67 \text{ (unit: in degrees)} \tag{13}$$

When the above $\theta_{32}$ exceeds the upper limit of the conditional expression (13), it is advantageous for distortion compensation and astigmatism compensation, however, not only precision for the shape of the aspherical surfaces is reduced, but also precision for shape management is reduced, thereby causing difficulties in stably producing lenses.

As for the entire lens system, in order to achieve downsizing and a favorable image quality, an angle of view (2·ωd) and an entire length of the lens system are required to be set to appropriate values. When the angle of view is set wide, a focal length is shortened, and therefore, it is advantageous for downsizing. However, aberration compensation has to be favorably performed at wide angle of view, and particularly, compensation for astigmatism or distortion is difficult.

On the other hand, when the angle of view is set narrow, the focal length needs to be set long, and therefore, it is disadvantageous when requiring downsizing, but astigmatism or distortion is easily compensated.

Consequently, it is preferable that the imaging lens system according to each of the embodiments satisfies the following conditional expressions to achieve downsizing in the entire lens system and a favorable image quality.

$$60 < 2 \cdot \omega d < 70 \tag{5}$$

$$1.2 < T/fd < 1.7 \tag{6}$$

Here,

ωd is a half view angle of the entire lens system to the d-line (unit: in degrees), and T is an entire length between the object side surface $r_{11}$ of the first lens element L1 and the image plane 105 (mm).

In the above conditional expression (5), a usual standard angle of view is set (about 35 mm using a 135 film camera).

In a case of downsizing the entire length of the entire lens system, the most favorable image quality is obtained by satisfying the above condition. When the ωd exceeds the upper limit of the above condition, the angle of view becomes narrow, and the focal length becomes long thereby lengthening the entire length. Therefore, downsizing cannot be achieved. When the ωd exceeds the lower limit thereof, the angle of view becomes excessively wide. Therefore, astigmatism and distortion cannot be compensated.

The conditional expression (6) is an expression indicating the ratio between the entire length of the above lens system and the focal length of the entire lens system. In order to achieve downsizing and a favorable image quality, this conditional expression needs to be satisfied. When the lower limit of the condition is exceeded, aberration on each of the lens surfaces occurs in a large amount, and therefore, a favorable image quality as a whole cannot be obtained. When the upper limit thereof is exceeded, downsizing cannot be achieved, thereby resulting in a less attractive imaging lens system.

In the imaging lens system according to each of the embodiments, in order to obtain a compact body and a favorable image quality, the power of the first lens element L1 needs to be designed with an appropriate value, and the bending shape also needs to be designed with an appropriate value.

Therefore, it is preferable that the following conditional expressions are satisfied.

$$1.4 < |fd/f1d| < 2.0 \tag{7}$$

$$0.3 < (r_{11} + r_{12})/(r_{11} - r_{12}) < 0.7 \tag{8}$$

Here, f1$d$ is a focal length of the first lens element L1 to the d-line (mm), $r_{11}$ is a radius of curvature of the object side surface of the first lens element L1 (mm), and $r_{12}$ is a radius of curvature of the image side surface of the first lens element L1 (mm).

The above conditional expression (7) indicates the power of the first lens element L1 with respect to the power of the entire lens system. When the lower limit of the expression is exceeded, a position of paraxial exit pupil for the entire lens system becomes excessively close to an image side, whereby an incident angle of an off-axial principal ray onto the image plane 105 cannot be reduced. When the upper limit thereof is exceeded, the amount of aberration occurrence in a single lens corresponding to the first lens element L1 becomes excessively large, and simultaneously, the tilt angle of a surface in the neighborhood of an effective diameter of the image side surface $r_{12}$ of the first lens element L1 becomes excessively large, thereby causing difficulties in manufacturing thereof. In consideration of the lens manufacturing, more preferably, it is preferable that the tilt angle of a surface $\theta_{12}$ in the neighborhood of the effective diameter of the image side surface $r_{12}$ of the first lens element L1 satisfies the following conditional expression (14).

Also, the above conditional expression (8) represents a shape factor indicating a bending shape of the first lens element L1. When the lower limit of the expression (8) is exceeded, spherical aberration and astigmatism at a high position of an image height occur in a large amount, and, when the upper limit thereof is exceeded, coma aberration occurs in a large amount, thereby causing difficulties in obtaining a favorable quality in either case.

$$\theta_{12} < 56 \text{ (unit: in degrees)} \tag{14}$$

In the conditional expression (14), when the $\theta_{12}$ exceeds the upper limit thereof, it is advantageous for distortion compensation and astigmatism compensation, however, not only precision for the shape of the aspherical surfaces is reduced., but also precision for shape management is reduced, thereby causing difficulties in stably producing lenses.

Also, in the second lens element L2 and the third lens element L3, it is preferable to have, in their effective diameters, at least one point taking a value of zero for a first-order differential of Z with respect to H (dZ/dH), where Z is depicted in the following expression indicating an aspherical surface.

$$Z = \frac{(1/CR) \cdot H^2}{1 + \sqrt{1 - (1+K) \cdot (1/CR)^2 \cdot H^2}} + \sum_{n=4}^{16} An \cdot H^n$$

Here, in a cylindrical coordinate system including: a Z axis referring to an axis extending toward an image plane side along an optical axis direction; and an H axis referring to an axis vertically extending along a direction away from the optical axis, CR is a paraxial radius of curvature (mm), K is a conic coefficient, and An is an n-th order aspherical coefficient.

In the second lens element L2 and the third lens element L3, when at least one point taking a value of zero for the dZ/dH is provided in the effective diameters, distortion is favorably compensated, and the incident angle of the off-axial principal ray onto the image plane 105 is advantageously reduced. Also, through reducing the incident angle of the off-axial principal ray onto the image plane 105, shading causing an illuminance reduction is effectively reduced.

Also, in the second lens element L2 and the third lens element L3, in order for chromatic aberration and a curvature of field, as a whole, to be compensated in a favorably well balanced manner, it is preferable that each of Abbe numbers satisfies the following conditional expressions.

$$25 < V2d < 35 \quad (9)$$

$$50 < V3d < 60 \quad (10)$$

The Abbe number refers to a value calculated from refractive indices to d-line (587.56 nm), F-line (486.13 nm), and C-line (656.27 nm), and is represented by the following expression.

$$Vd = \frac{(Nd - 1)}{(Nf - Nc)}$$

Here, Nd, Nf, Nc are refractive indices to d-line, F-line, and C-line, respectively.

The above conditional expressions (9) and (10) respectively designate the Abbe numbers of a material for the second lens element L2 and the third lens element L3. In the conditional expression (9), when V2d exceeds the lower limit thereof, chromatic aberration is favorably compensated, but a Petzval sum for the entire lens system becomes excessively large whereby the curvature of field becomes large, and, when V2d exceeds the upper limit thereof, the chromatic aberration is insufficiently compensated, and simultaneously, the power of each lens is required to be more increased, whereby the amount of aberration occurring in a single lens becomes excessively large, causing difficulties in obtaining a favorable image quality in either case.

In the above conditional expression (10), when exceeds the lower limit thereof, chromatic aberration of magnification, in particular, occurs in a large amount, and, when V3d exceeds the upper limit thereof, the chromatic aberration of magnification is excessively compensated, and simultaneously, the Petzval sum for the entire lens system becomes large whereby the curvature of field becomes large, causing difficulties in obtaining a favorable image quality in either case.

Also, it is preferable that the first lens element L1 satisfies the following conditional expression (11) in order for the chromatic aberration as a whole to be favorably compensated.

$$50 < V1d < 65 \quad (11)$$

The above conditional expression (11) designates an Abbe number of a material for the first lens element L1. When the lower limit of the conditional expression (11) is exceeded, axial chromatic aberration is insufficiently compensated, and, when the upper limit thereof is exceeded, chromatic aberration can be favorably compensated, but the Petzval sum becomes large whereby the curvature of field becomes large, causing difficulties in obtaining a favorable image quality in either case.

The aperture diaphragm 100 is positioned on a side closest to an object, and therefore, the incident angle of the off-axial principal ray onto the image plane 105 can be reduced, and shading causing an illuminance reduction is effectively reduced.

Also, in order to achieve downsizing for the lenses, it is preferable that the incident angle is maintained in a reasonable range, and therefore, it is desired to set an appropriate value to the incident angle of the off-axial principal ray.

Therefore, more preferably, it is preferable that the maximum incident angle of the off-axial principal ray onto the image plane 105 ($\theta$max) satisfies the following conditional expression (12).

$$10 < \theta\text{max} < 25 \text{ (unit: in degrees)} \quad (12)$$

In the above conditional expression (12), when the $\theta$max exceeds the lower limit thereof, the entire lens system cannot be downsized, and, when the $\theta$max exceeds the upper limit thereof, shading becomes large, thereby substantially reducing ambient illuminance.

The OLPF 104 is constructed with a material having birefringent characteristics, such as a crystal. The solid-state image sensor 106 such as a CCD takes an object image, formed by the imaging lens, as a two dimensional sampling image having a low numerical aperture. Therefore, high frequencies equal to or more than half of sampling frequency become false signals. In order to eliminate such high frequency components of an image in advance, it is preferable that the OLPF 104 is positioned between the third lens element L3 and the image plane 105.

Also, more preferably, because the solid-state image sensor 106 is generally highly sensitive to light in the infrared region, in order to have natural color reproduction, the OLPF 104 is preferably provided with an IR cut function for filtering out the light in the infrared region, by providing an IR absorbing material or coating.

Hereinafter, concrete numeral data corresponding to Embodiments 1 to 9 are shown as Numerical examples 1 to 9.

(Numerical example 1)

| Surface number | Radius of curvature Rd | Distance d | Refractive index nd | Abbe number vd |
|---|---|---|---|---|
| 1 | INF | 0.35 | | |
| 2 | 4.89911 | 1.152 | 1.60602 | 57.5 |
| 3 | −2.08542 | 0.6618 | | |
| 4 | −0.95475 | 0.987 | 1.58387 | 30.9 |
| 5 | −4.51679 | 0.3675 | | |
| 6 | 2.23064 | 2.1594 | 1.53116 | 56.0 |
| 7 | 6.60981 | 0.3 | | |

-continued (Numerical example 1)

| | | | | | |
|---|---|---|---|---|---|
| 8 | INF | 0.43 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 2 | 2.58408E+01 | −6.84156E−02 | −6.21333E−02 | 1.07211E−02 | −9.07655E−02 | 1.35421E−02 | 1.17743E−01 | −1.68189E−01 |
| 3 | 1.33811E+00 | −2.70276E−02 | −1.35115E−02 | −9.19301E−03 | 1.44867E−02 | −1.70906E−03 | −6.42628E−03 | 2.30094E−03 |
| 4 | −8.70576E−01 | 1.31794E−01 | −4.89178E−02 | −4.57772E−02 | 1.71945E−01 | −1.90392E−01 | 9.95169E−02 | −2.01315E−02 |
| 5 | 3.44373E+00 | 1.75876E−02 | 1.53343E−02 | 1.02894E−02 | −6.70791E−03 | −2.17982E−04 | 9.16302E−04 | −1.74721E−04 |
| 6 | −8.44035E+00 | −6.94865E−03 | 2.98410E−04 | 2.78163E−04 | −6.31408E−05 | 4.89103E−06 | −9.36535E−08 | −2.19446E−08 |
| 7 | −3.42779E+00 | −1.79099E−02 | 2.36410E−03 | −5.19999E−04 | 5.68945E−05 | −2.98338E−06 | 1.42863E−07 | −1.05161E−08 |

(Numerical example 2)

| Surface number | Radius of curvature Rd | Distance d | Refractive index nd | Abbe number vd |
|---|---|---|---|---|
| 1 | INF | 0.35 | | |
| 2 | 4.89911 | 1.152 | 1.60602 | 57.5 |
| 3 | −2.08542 | 0.6618 | | |
| 4 | −0.95813 | 1.0269 | 1.58387 | 30.9 |
| 5 | −4.5325 | 0.3363 | | |
| 6 | 2.25852 | 2.1588 | 1.53116 | 56.0 |
| 7 | 6.6461 | 0.3 | | |
| 8 | INF | 0.43 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 2 | 2.58408E+01 | −6.84156E−02 | −6.21334E−02 | 1.07210E−02 | −9.07655E−02 | 1.35422E−02 | 1.17743E−01 | −1.68189E−01 |
| 3 | 1.33811E+00 | −2.70276E−02 | −1.35115E−02 | −9.19300E−03 | 1.44867E−02 | −1.70906E−03 | −6.42628E−03 | 2.30094E−03 |
| 4 | −8.70591E−01 | 1.31839E−01 | −4.89233E−02 | −4.59445E−02 | 1.71757E−01 | −1.90481E−01 | 9.95151E−02 | −2.00899E−02 |
| 5 | 3.47582E+00 | 1.77139E−02 | 1.52622E−02 | 1.02421E−02 | −6.72504E−03 | −2.21724E−04 | 9.16884E−04 | −1.73322E−04 |
| 6 | −8.50891E+00 | −6.72094E−03 | 3.35327E−04 | 2.67567E−04 | −6.40441E−05 | 4.91179E−06 | −7.78488E−08 | −1.88608E−08 |
| 7 | −2.05058E+00 | −1.78476E−02 | 2.25532E−03 | −5.22183E−04 | 5.74739E−05 | −2.94368E−06 | 1.43928E−07 | −1.05904E−08 |

(Numerical example 3)

| Surface number | Radius of curvature Rd | Distance d | Refractive index nd | Abbe number vd |
|---|---|---|---|---|
| 1 | INF | 0.35 | | |
| 2 | 4.89911 | 1.152 | 1.60602 | 57.5 |
| 3 | −2.08542 | 0.6618 | | |
| 4 | −0.9582 | 1.0272 | 1.58387 | 30.9 |
| 5 | −4.53286 | 0.336 | | |
| 6 | 2.24956 | 2.2162 | 1.53116 | 56.0 |
| 7 | 6.57816 | 0.3 | | |
| 8 | INF | 0.43 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 2 | 2.58408E+01 | −6.84156E−02 | −6.21334E−02 | 1.07210E−02 | −9.07655E−02 | 1.35422E−02 | 1.17743E−01 | −1.68189E−01 |
| 3 | 1.33811E+00 | −2.70276E−02 | −1.35115E−02 | −9.19300E−03 | 1.44867E−02 | −1.70906E−03 | −6.42628E−03 | 2.30094E−03 |
| 4 | −8.70481E−01 | 1.31820E−01 | −4.89328E−02 | −4.59531E−02 | 1.71754E−01 | −1.90477E−01 | 9.95204E−02 | −2.00904E−02 |
| 5 | 3.47671E+00 | 1.77170E−02 | 1.52602E−02 | 1.02408E−02 | −6.72558E−03 | −2.21879E−04 | 9.16894E−04 | −1.73257E−04 |
| 6 | −8.37097E+00 | −6.17947E−03 | 5.63553E−04 | 2.28399E−04 | −6.18810E−05 | 5.00436E−06 | −9.86419E−08 | −1.25937E−08 |
| 7 | −2.93906E+00 | −1.65471E−02 | 2.09079E−04 | −4.91484E−04 | 5.77343E−05 | −3.23446E−06 | 1.25237E−07 | −6.90898E−09 |

(Numerical example 4)

| Surface number | Radius of curvature Rd | Distance d | Refractive index nd | Abbe number vd |
|---|---|---|---|---|
| 1 | INF | 0.35 | | |
| 2 | 5.13176 | 1.1858 | 1.60602 | 57.5 |
| 3 | −2.0626 | 0.6495 | | |
| 4 | −0.95563 | 0.9102 | 1.58387 | 30.9 |
| 5 | −4.58256 | 0.3929 | | |
| 6 | 2.19872 | 2.0549 | 1.53116 | 56.0 |
| 7 | 7.86594 | 0.3 | | |
| 8 | INF | 0.43 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 2 | 2.58465E+01 | −6.53643E−02 | −5.70615E−02 | 5.12728E−03 | −1.00546E−01 | 1.01476E−02 | 1.27524E−01 | −1.43226E−01 |
| 3 | 1.35899E+00 | −2.84020E−02 | −1.37565E−02 | −8.67808E−03 | 1.46609E−02 | −2.02273E−03 | −6.68782E−03 | 2.46902E−03 |
| 4 | −8.59214E−01 | 1.29496E−01 | −4.83813E−02 | −4.65824E−02 | 1.70338E−01 | −1.90674E−01 | 1.00189E−01 | −2.02053E−02 |
| 5 | 3.54447E+00 | 1.75573E−02 | 1.51694E−02 | 1.01856E−02 | −6.75128E−03 | −2.34773E−04 | 9.13041E−04 | −1.71567E−04 |
| 6 | −7.61925E+00 | −9.00511E−03 | 6.82672E−04 | 1.87463E−04 | −6.52365E−05 | 4.93797E−06 | −7.56999E−08 | −7.47629E−09 |
| 7 | 2.31319E+00 | −1.59024E−02 | 1.73506E−03 | −5.04314E−04 | 5.83937E−05 | −3.22142E−06 | 1.22810E−07 | −7.29160E−09 |

(Numerical example 5)

| Surface number | Radius of curvature Rd | Distance d | Refractive index nd | Abbe number vd |
|---|---|---|---|---|
| 1 | INF | 0.35 | | |
| 2 | 4.89864 | 1.1632 | 1.60602 | 57.5 |
| 3 | −2.10663 | 0.6586 | | |
| 4 | −0.95927 | 0.9151 | 1.58387 | 30.9 |
| 5 | −4.74767 | 0.4043 | | |
| 6 | 2.22455 | 2.1242 | 1.53116 | 56.0 |
| 7 | 8.24416 | 0.3 | | |
| 8 | INF | 0.43 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 2 | 2.56578E+01 | −6.51569E−02 | −6.19700E−02 | 3.22834E−03 | −9.17943E−02 | 3.03517E−02 | 1.30271E−01 | −1.88547E−01 |
| 3 | 1.34723E+00 | −2.89314E−02 | −1.32113E−02 | −8.12905E−03 | 1.45408E−02 | −2.42841E−03 | −6.94103E−03 | 2.93831E−03 |
| 4 | −8.63825E−01 | 1.30469E−01 | −4.72208E−02 | −4.58781E−02 | 1.71000E−01 | −1.90131E−01 | 1.00571E−01 | −2.04289E−02 |
| 5 | 3.43006E+00 | 1.71864E−02 | 1.52386E−02 | 1.02819E−02 | −6.77267E−03 | −2.27277E−04 | 9.20742E−04 | −1.70615E−04 |
| 6 | −7.86820E+00 | −9.62610E−03 | 7.39677E−04 | 2.03989E−04 | −6.48984E−05 | 4.97891E−06 | −7.77507E−08 | −8.26887E−09 |
| 7 | 1.62582E+00 | −1.60072E−02 | 1.82955E−03 | −4.98787E−04 | 5.84831E−05 | −3.22768E−06 | 1.19122E−07 | −7.79576E−09 |

(Numerical example 6)

| Surface number | Radius of curvature Rd | Distance d | Refractive index nd | Abbe number vd |
|---|---|---|---|---|
| 1 | INF | 0.35 | | |
| 2 | 9.33932 | 1.2068 | 1.60602 | 57.5 |
| 3 | −2.06529 | 0.8427 | | |
| 4 | −1.06161 | 0.8985 | 1.58387 | 30.9 |
| 5 | −4.94499 | 0.3928 | | |
| 6 | 2.23042 | 1.96 | 1.53116 | 56.0 |
| 7 | 8.2278 | 0.3 | | |
| 8 | INF | 0.43 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 3 | 1.50629E+01 | −4.61001E−02 | −5.76962E−02 | 1.68626E−01 | −2.23054E−01 | −2.54078E−01 | 6.27470E−01 | −2.68138E−01 |
| 4 | 1.27418E+00 | −7.67609E−03 | 1.00519E−02 | −9.23062E−03 | 5.86144E−03 | 2.74694E−03 | −1.31625E−02 | 8.23648E−03 |
| 5 | −8.37673E−01 | 1.66725E−01 | −3.99077E−02 | 4.14765E−02 | −3.81093E−02 | −6.22095E−03 | 1.99685E−02 | −5.64656E−03 |
| 6 | −7.95426E+00 | 1.24542E−02 | 3.23980E−02 | −7.33465E−03 | −1.48070E−03 | 3.26087E−05 | 3.01644E−04 | −5.01424E−05 |
| 7 | −8.78752E+00 | 1.74804E−03 | −1.97116E−03 | 7.53928E−04 | −1.05983E−04 | 8.11665E−07 | 1.18909E−06 | −8.80260E−08 |
| 8 | −9.66135E−01 | −1.64663E−02 | 2.24248E−03 | −4.81394E−04 | 5.82643E−05 | −2.55354E−06 | 1.06431E−09 | −2.05121E−09 |

(Numerical example 7)

| Surface number | Radius of curvature Rd | Distance d | Refractive index nd | Abbe number vd |
|---|---|---|---|---|
| 1 | INF | 0.35 | | |
| 2 | 5.96632 | 1.4353 | 1.60602 | 57.5 |
| 3 | −2.15509 | 0.7346 | | |
| 4 | −0.95508 | 0.8608 | 1.58387 | 30.9 |
| 5 | −3.5575 | 0.3905 | | |
| 6 | 2.31838 | 2.1115 | 1.53116 | 56.0 |
| 7 | 7.30243 | 0.3 | | |
| 8 | INF | 0.48 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 3 | 3.31383E+01 | −5.25450E−02 | −1.68418E−02 | −8.09347E−03 | 3.71994E−03 | −3.41435E−02 | 6.98813E−02 | −5.21320E−02 |
| 4 | 9.46842E−01 | −5.67226E−03 | 1.19113E−02 | −5.62526E−03 | 4.54769E−03 | −2.72360E−03 | 1.05920E−03 | 4.55049E−05 |
| 5 | −9.39180E−01 | 1.83795E−01 | −1.97922E−02 | −7.25830E−03 | −2.59880E−03 | 2.95957E−03 | 1.60233E−05 | −1.45957E−04 |
| 6 | −9.68356E+00 | 1.30891E−02 | 3.37407E−02 | −8.19573E−03 | −8.59144E−04 | 2.08738E−04 | 1.01812E−04 | −1.77164E−05 |
| 7 | −8.09959E+00 | −4.08196E−03 | 3.01222E−04 | 2.16750E−04 | −5.48952E−05 | 5.57781E−06 | −2.08037E−07 | −4.00912E−09 |
| 8 | −2.77554E+00 | −1.58978E−02 | 2.11087E−03 | −4.66261E−04 | 5.64875E−05 | −3.18946E−06 | 1.03448E−07 | −4.25283E−09 |

(Numerical example 8)

| Surface number | Radius of curvature Rd | Distance d | Refractive index nd | Abbe number vd |
|---|---|---|---|---|
| 1 | INF | 0.3246 | | |
| 2 | 6.4703 | 1.2495 | 1.60602 | 57.5 |
| 3 | −1.8236 | 0.733 | | |
| 4 | −0.8238 | 0.938 | 1.58387 | 30.9 |
| 5 | −2.9321 | 0.2201 | | |
| 6 | 2.00602 | 1.75 | 1.52996 | 55.8 |
| 7 | 5.7801 | 0.3 | | |
| 8 | INF | 0.48 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 3 | −7.52521E+00 | −4.75316E−02 | −3.26435E−02 | 1.72094E−02 | 4.94040E−02 | −3.12602E−01 | 4.60163E−01 | −2.16665E−01 |
| 4 | 9.54561E−01 | −1.00819E−02 | 3.15306E−02 | −2.32362E−02 | 1.26067E−02 | 4.52437E−03 | −7.33530E−03 | 3.64479E−03 |

-continued (Numerical example 8)

| | | | | | | | | |
|---|---|---|---|---|---|---|---|---|
| 5 | −7.86540E−01 | 2.79708E−01 | −2.30800E−02 | −1.18459E−02 | −8.33045E−03 | 1.61864E−02 | −3.84045E−03 | −4.82111E−04 |
| 6 | −3.03037E+00 | 3.19352E−04 | 7.34520E−02 | −2.36939E−02 | −1.67352E−03 | 1.37139E−03 | 3.73315E−04 | −1.49276E−04 |
| 7 | −9.80269E+00 | −6.08300E−03 | 4.47725E−03 | −1.81717E−03 | 1.58301E−04 | 1.08348E−04 | −3.05909E−05 | 2.14842E−06 |
| 8 | −1.09384E+01 | −3.18431E−02 | 1.24005E−02 | −4.40912E−03 | 7.60818E−04 | −3.81712E−05 | −3.95205E−06 | 3.48905E−07 |

(Numerical example 9)

| Surface number | Radius of curvature Rd | Distance d | Refractive index nd | Abbe number vd |
|---|---|---|---|---|
| 1 | INF | 0 | | |
| 2 | 3.9653 | 0.8889 | 1.52996 | 57.5 |
| 3 | −1.8248 | 0.7145 | | |
| 4 | −0.6965 | 0.5212 | 1.58387 | 30.9 |
| 5 | −1.9538 | 0.3 | | |
| 6 | 1.4842 | 1.1411 | 1.52996 | 55.8 |
| 7 | 5.4462 | 0.3 | | |
| 8 | INF | 0.3 | 1.51633 | 64.1 |
| 9 | INF | 0 | | |

Aspherical coefficient

| Surface number | K | A4 | A6 | A8 | A10 | A12 | A14 | A16 |
|---|---|---|---|---|---|---|---|---|
| 3 | 7.30796E+00 | −1.11507E−01 | −1.16775E−02 | −1.80257E−01 | 6.21600E−01 | −3.93527E+00 | 1.01325E+01 | 8.81289E+00 |
| 4 | 5.64495E−01 | −8.03762E−02 | 5.99553E−02 | −2.23847E−01 | 2.28892E−01 | 2.52605E−01 | −6.47077E−01 | 3.04581E−01 |
| 5 | −1.42200E+00 | 2.41434E−01 | −7.28519E−02 | 1.83016E−01 | −3.94518E−01 | 5.41646E−01 | −4.29104E−01 | 1.26357E−01 |
| 6 | −2.86305E+00 | 2.42264E−02 | 1.88105E−01 | −1.16615E−01 | 3.62356E−02 | −3.56405E−03 | −2.37857E−03 | −2.03370E−04 |
| 7 | −7.23765E+00 | −4.26307E−03 | −3.48968E−03 | 3.96766E−03 | −8.79389E−04 | −7.60369E−04 | 4.00258E−04 | −5.48302E−05 |
| 8 | −2.11172E+00 | −3.52522E−02 | 6.27474E−03 | 9.74512E−03 | −1.43137E−03 | 2.77429E−04 | 4.75851E−06 | −4.54756E−06 |

Here, FIGS. 2, 4, 6, 8, 10, 12, 14, 16, and 18 are aberration diagrams corresponding to Numerical examples 1 to 9.

In these aberration diagrams, (a) is a graph showing spherical aberration (SA), (b) is a graph showing astigmatism (AST), and (c) is a graph showing distortion (DIS).

Table 10 shows values for the above numerical examples and numerical values for the conditional expressions.

TABLE 10 for numerical values of conditional expressions

| | | Example 1 | Example 2 | Example 3 | Example 4 | Example 5 | Example 6 | Example 7 | Example 8 | Example 9 |
|---|---|---|---|---|---|---|---|---|---|---|
| | fd | 5.013 | 5.026 | 4.999 | 4.995 | 5.038 | 5.261 | 5.174 | 4.500 | 3.780 |
| | f1d | 2.574 | 2.574 | 2.574 | 2.589 | 2.593 | 2.907 | 2.799 | 2.489 | 2.491 |
| | f2d | −2.309 | −2.327 | −2.328 | −2.279 | −2.260 | −2.531 | −2.547 | −2.347 | −2.188 |
| | f3d | 5.413 | 5.502 | 5.465 | 5.104 | 5.110 | 5.174 | 5.576 | 4.995 | 3.500 |
| Conditional expression (1) | |fd/f2d| | 2.170 | 2.160 | 2.148 | 2.192 | 2.229 | 2.079 | 2.032 | 1.917 | 1.728 |
| Conditional expression (2) | |fd/f3d| | 0.926 | 0.914 | 0.915 | 0.979 | 0.986 | 1.017 | 0.928 | 0.901 | 1.080 |
| Conditional expression (3) | (r21 + r22)/(r21 − r22) | −1.536 | −1.536 | −1.536 | −1.527 | −1.506 | −1.547 | −1.734 | −1.781 | −2.108 |
| Conditional expression (4) | (r31 + r32)/(r31 − r32) | −2.019 | −2.030 | −2.039 | −1.776 | −1.739 | −1.744 | −1.930 | −2.063 | −1.749 |
| Conditional expression (5) | 2·ωd | 66.926 | 67.538 | 67.230 | 67.222 | 66.840 | 65.190 | 66.054 | 63.506 | 62.084 |
| Conditional expression (6) | T/fd | 1.409 | 1.410 | 1.418 | 1.415 | 1.406 | 1.410 | 1.440 | 1.474 | 1.399 |
| Conditional expression (7) | |fd/f1d| | 1.947 | 1.953 | 1.942 | 1.930 | 1.943 | 1.810 | 1.848 | 1.808 | 1.518 |
| Conditional expression (8) | (r11 + r12)/(r11 − r12) | 0.403 | 0.403 | 0.403 | 0.427 | 0.399 | 0.638 | 0.469 | 0.560 | 0.370 |
| Conditional expression (9) | V2d | 30.900 | 30.900 | 30.900 | 30.900 | 30.900 | 30.900 | 30.900 | 30.900 | 30.900 |
| Conditional expression (10) | V3d | 55.800 | 55.800 | 55.800 | 55.800 | 55.800 | 55.800 | 55.800 | 55.800 | 55.800 |
| | T | 7.063 | 7.086 | 7.088 | 7.067 | 7.084 | 7.419 | 7.450 | 6.632 | 5.288 |

Figure 19:
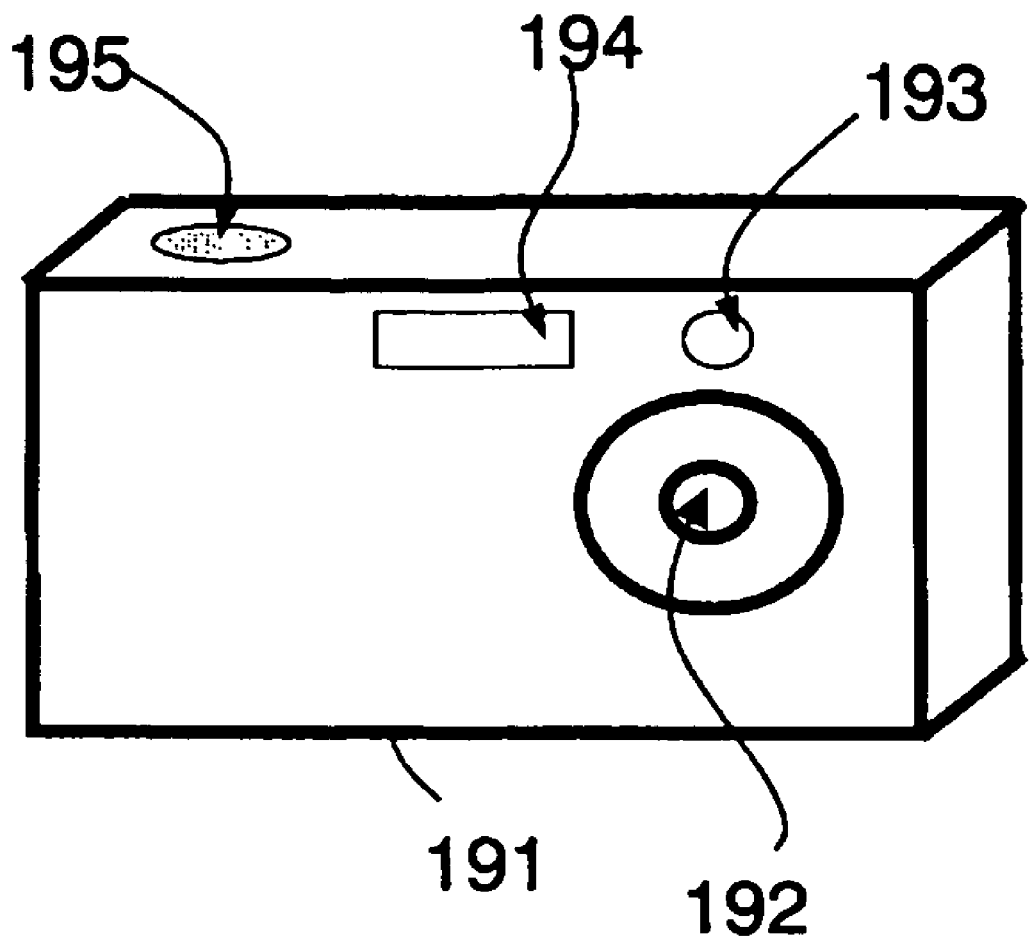
FIG. 19 is a schematic diagrammatic perspective view of an optical device showing an embodiment of the present invention.

With reference to FIG. 19, there is described an embodiment for an optical device provided with imaging lenses according to the above embodiments and numerical examples.

In FIG. 19, 191 denotes a body of the optical device, such as a digital camera, provided with the imaging lens of the present invention, 192 denotes the imaging lens, 193 denotes an optical finder separately incorporated in the body of the optical device, 194 denotes a strobe light, and 195 denotes a release button.

By providing the imaging lens of the present invention with an optical device such as a digital camera, as above, a compact optical device with high optical performance can be achieved.

INDUSTRIAL APPLICABILITY

The present invention is effective in providing an imaging lens system having a small number of lenses and with high optical performance, and an optical device such as a digital camera or a mobile telephone terminal provided with a camera, which is compact and of high optical performance, by having the system therein.

The invention claimed is:

1. An imaging lens system for forming an optical image of an object on a light receiving surface of a solid-state image sensor, comprising, in order from an object side:

an aperture diaphragm; and three lens elements which are a first lens element having a positive optical power and a convex surface on an image side, a second lens element having a negative optical power and being a meniscus lens whose object side has a concave shape, and a third lens element having a positive optical power and being a meniscus lens whose object side has a convex shape, wherein the following conditional expressions are satisfied:

$1.5 < |fd/f2d| < 2.3$ (1)

$0.5 < |fd/f3d| < 1.1$ (2)

$-2.2 < (r_{21}+r_{22})/(r_{21}-r_{22}) < -1.3$ (3)

$-2.1 < (r_{31}+r_{32})/(r_{31}-r_{32}) < -1.7$ (4)

wherein, fd is a composite focal length of an entire imaging lens system to d-line in mm, f2d is a focal length of the second lens element to the d-line in mm, f3d is a focal length of the third lens element to the d-line in mm, $r_{21}$ is a radius of curvature of an object side surface of the second lens element in mm, $r_{22}$ is a radius of curvature of an image side surface of the second lens element in mm, $r_{31}$ is a radius of curvature of an object side surface of the third lens element in mm, and $r_{32}$ is a radius of curvature of an image side surface of the third lens element in mm, and wherein the following conditional expressions are satisfied:

$1.4 < |fd/f1d| < 2.0$ (7)

$0.3 < (r_{11}+r_{12})/(r_{11}-r_{12}) < 0.7$ (8)

wherein, f1d is a focal length of the first lens element to the d-line in mm, $r_{11}$ is a radius of curvature of the object side surface of the first lens element in mm, and $r_{12}$ is a radius of curvature of an image side surface of the first lens element in mm.

2. The imaging lens system according to claim 1, wherein at least one of the first lens element, the second lens element and the third lens element has aspherical surfaces on both faces.

3. The imaging lens system according to claim 1, wherein following conditional expressions are satisfied:

$60 < 2 \cdot \omega d < 70$ (5)

$1.2 < T/fd < 1.7$ (6)

wherein,

ωd is a half view angle of the entire imaging lens system to the d-line in degrees, and T is an entire length between an object side surface of the first lens element and the image side surface of the third lens element in mm.

4. The imaging lens system according to claim 1, wherein the second lens element and the third lens element have, in effective diameters, at least one point taking a value of zero for a first-order differential as to H, H being a coordinate along a direction perpendicular to an optical axis in the following expression indicating an aspherical surface shape, $$Z = \frac{(1/CR) \cdot H^2}{1 + \sqrt{1 - (1+K) \cdot (1/CR)^2 \cdot H^2}} + \sum_{n=4}^{16} An \cdot H^n$$

wherein, in a cylindrical coordinate system including a Z axis referring to an axis extending toward an image plane side along an optical axis direction, and an H axis referring to an axis vertically extending along a direction away from the optical axis, CR is a paraxial radius of curvature in mm, K is a conic coefficient, and An is an n-th order aspherical coefficient.

5. The imaging lens system according to claim 1, wherein the first lens element satisfies the following conditional expression (11):

$50 < V1d < 65$ (11)

wherein,

V1d is an Abbe number of the first lens element.

6. An imaging unit operable to convert an optical image of an object to an electrical image signal for output, comprising:

an imaging lens system for forming the optical image of the object; and a solid-state image sensor for receiving the image formed by the imaging lens system, and converting the image to the electrical image signal, wherein the imaging lens system is an imaging lens system according to claim 1.

7. The imaging unit according to claim 6, wherein an optical low-pass filter is provided on an object side with respect to the solid-state image sensor.

8. An optical device used for taking an optical image of an object as an electrical image signal, comprising:

an imaging unit operable to convert the optical image of the object to the electrical image signal for output; and a body for accommodating the imaging unit, wherein the imaging unit comprises:

an imaging lens system for forming the optical image of the object; and a solid-state image sensor for receiving the image formed by the imaging lens system, and converting the image to the electrical image signal, wherein the imaging lens system is an imaging lens system according to claim 1.

9. An imaging lens system for forming an optical image of an object on a light receiving surface of a solid-state image sensor, comprising, in order from an object side:

an aperture diaphragm; and three lens elements which are a first lens element having a positive optical power and a convex surface on an image side, a second lens element having a negative optical power and being a meniscus lens whose object side has a concave shape, and a third lens element having a positive optical power and being a meniscus lens whose object side has a convex shape, wherein the following conditional expressions are satisfied:

$$1.5 < |fd/f2d| < 2.3 \quad (1)$$

$$0.5 < |fd/f3d| < 1.1 \quad (2)$$

$$-2.2 < (r_{21}+r_{22})/(r_{21}-r_{22}) < -1.3 \quad (3)$$

$$-2.1 < (r_{31}+r_{32})/(r_{31}-r_{32}) < -1.7 \quad (4)$$

wherein, fd is a composite focal length of an entire imaging lens system to d-line in mm, f2d is a focal length of the second lens element to the d-line in mm, f3d is a focal length of the third lens element to the d-line in mm, $r_{21}$ is a radius of curvature of an object side surface of the second lens element in mm, $r_{22}$ is a radius of curvature of an image side surface of the second lens element in mm, $r_{31}$ is a radius of curvature of an object side surface of the third lens element in mm, and $r_{32}$ is a radius of curvature of an image side surface of the third lens element in mm, and wherein the second lens element and the third lens element are formed from a synthetic resin material, and satisfy the following conditional expressions (9) and (10):

$$25 < V2d < 35 \quad (9)$$

$$50 < V3d < 60 \quad (10)$$

wherein,

V2d is an Abbe number of the first lens element.

V3d is an Abbe number of the first lens element.

10. The imaging lens system according to claim 9, wherein at least one of the first lens element, the second lens element and the third lens element has aspherical surfaces on both faces.

11. The imaging lens system according to claim 9, wherein the following conditional expressions are satisfied:

$$60 < 2 \cdot \omega d < 70 \quad (5)$$

$$1.2 < T/fd < 1.7 \quad (6)$$

wherein,

ωd is a half view angle of the entire imaging lens system to the d-line in degrees, and T is an entire length between an object side surface of the first lens element and the image side surface of the third lens element in mm.

12. The imaging lens system according to claim 9, wherein the second lens element and the third lens element have, in effective diameters, at least one point taking a value of zero for a first-order differential as to H, wherein H being a coordinate along a direction perpendicular to an optical axis in the following expression indicating an aspherical surface shape, $$Z = \frac{(1/CR) \cdot H^2}{1 + \sqrt{1 - (1+K) \cdot (1/CR)^2 \cdot H^2}} + \sum_{n=4}^{16} An \cdot H^n$$

wherein, in a cylindrical coordinate system including a Z axis referring to an axis extending toward an image plane side along an optical axis direction, and an H axis referring to an axis vertically extending along a direction away from the optical axis, CR is a paraxial radius of curvature in mm, K is a conic coefficient, and An is an n-th order aspherical coefficient.

13. The imaging lens system according to claim 9, wherein the first lens element satisfies the following conditional expression (11):

$$50 < V1d < 65 \quad (11)$$

wherein,

V1d is an Abbe number of the first lens element.

14. An imaging unit operable to convert an optical image of an object to an electrical image signal for output, comprising:

an imaging lens system for forming the optical image of the object; and a solid-state image sensor for receiving the image formed by the imaging lens system, and converting the image to the electrical image signal, wherein the imaging lens system is an imaging lens system according to claim 9.

15. The imaging unit according to claim 14, wherein an optical low-pass filter is provided on an object side with respect to the solid-state image sensor.

16. An optical device used for taking an optical image of an object as an electrical image signal, comprising:

an imaging unit operable to convert the optical image of the object to the electrical image signal for output; and a body for accommodating the imaging unit, wherein the imaging unit comprises:

an imaging lens system for forming the optical image of the object; and a solid-state image sensor for receiving the image formed by the imaging lens system, and converting the image to the electrical image signal, wherein the imaging lens system is an imaging lens system according to claim 9.

* * * * *